INVENTORS
ARLAN B. HALE
STANTON E. PARRISH
BY
ATTORNEY

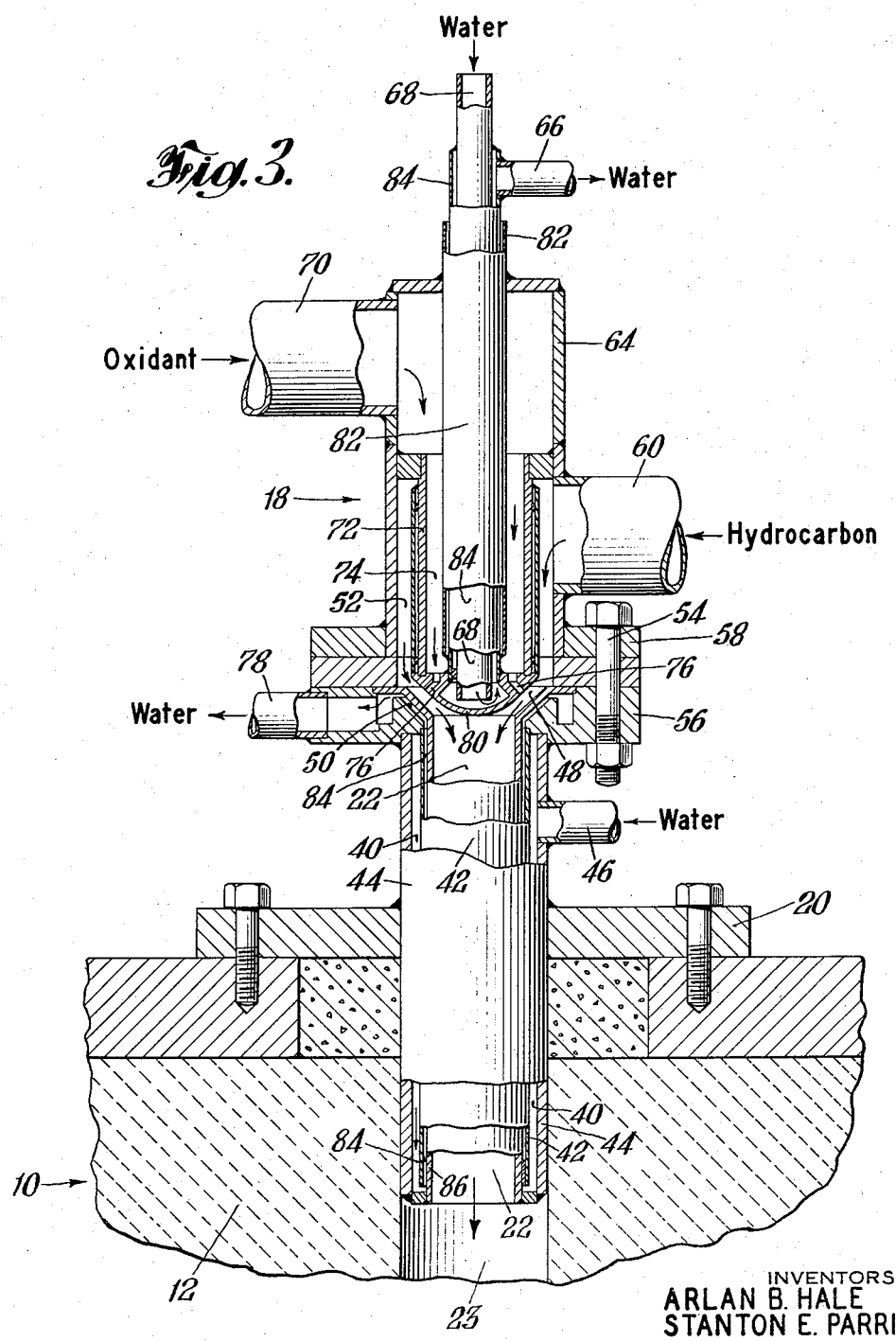

United States Patent Office 2,868,856
Patented Jan. 13, 1959

2,868,856

PROCESS AND APPARATUS FOR PARTIAL OXIDATION OF HYDROCARBONS

Arlan B. Hale, St. Albans, and Stanton E. Parrish, South Charleston, W. Va., assignors to Union Carbide Corporation, a corporation of Delaware Application June 21, 1955, Serial No. 516,936

6 Claims. (Cl. 260—679)

The present invention relates to the production of acetylene from hydrocarbons, such as methane, by the partial oxidation thereof.

Heretofore, many systems have been proposed for the production of acetylene by the partial oxidation of hydrocarbons but none of these processes gives desirable large-volume, high-percentage yields of acetylene together with long periods of trouble free continuous operation.

In one process, a non-stoichiometric (insufficient oxygen for complete combustion) mixture of preheated saturated hydrocarbon gas (natural gas) and oxygen is passed through a multi-opening plate and there ignited to utilize the plate as a flame holder. The hot combustion products containing acetylene are rapidly quenched in water and the acetylene is removed from the other combustion products. The above process employs a gas flow rate during mixing of approximately 300 feet per second and is fraught with operating difficulties such as preignition, and erratic operation.

It has been found that, to obtain high yields of acetylene in a process of partial oxidation of a hydrocarbon, it is imperative that certain essential requirements are met. These requirements are: (1) Both the hydrocarbon and oxidant should be preheated prior to mixing to as high a temperature as possible without causing preignition during mixing; (2) if premixing is used intimate mixing of the preheated hydrocarbon and preheated oxidant should be effected in as short a time interval as possible to prevent preignitions at the mixing point and to minimize preheat loss; and (3) the partial oxidation reaction and the reaction of methane or other hydrocarbons to form acetylene should be effected at a relatively high temperature in as short a time interval as possible to maintain high acetylene yields.

More specifically, for a given mixture of reactants, the percentage of acetylene in the product has been found to be greatly effected by the temperature to which the reactants are preheated, since the volume of acetylene produced is favored by high temperature. The extent of preheating to be effected is limited for practical reasons to a maximum temperature that will not result in excessive preignitions at the mixing point. Should the oxidant stream be preheated to too high a temperature, oxidation of the interior of the metal oxidant conduits would occur. Should the hydrocarbon be preheated to too high a temperature, pyrolysis would occur to cause harmful carbon deposition on the walls of the apparatus and result in plugging of the preheater tubes.

The above-mentioned rapid and intimate mixing of preheated hydrocarbon and oxidant at the highest practical temperatures is required for high yields of acetylene in the reaction products. This is required, among other reasons, to minimize the loss of some of the pre-heat through the apparatus walls which occurs during mixing if the mixer is cooled by water or other coolant. Slower mixing, would, of course, increase the loss of pre-heat from the reactants and effect the yield and volume percentage of acetylene in the yield.

In addition, rapid mixing eliminates regions of high oxygen concentrations which tend to cause pre-ignition prior to the achievement of an intimate and uniform mixture.

Similarly, it has been taught in the prior art that rapid quenching of the reaction products is required to prevent decomposition of the contained acetylene. The quenching should not be carried out too close to the reaction zone flame, and should not be too remote from the reaction zone to permit acetylene decomposition.

While most of the requirements discussed above were understood by the prior art, no process was proposed for meeting all of them.

In application Serial No. 516,958 entitled "Production of Acetylene," filed concurrently herewith by George H. Smith, there is described a process for impinging a preheated stream of stock, containing a gaseous hydrocarbon, and a preheated stream of gaseous oxidant in non-stoichiometric proportions (insufficient oxygen for obtaining complete combustion) at a near sonic velocity greater than Mach number 0.5 (approximately 1,000 feet per second for 2:1 $CH_4$—$O_2$ mixture at 800° C.), and preferably at near a Mach number of 1.0 (approximately 2,000 feet per second), to accomplish mixing; and a process is described for igniting the mixture as it is injected into a reaction zone to accomplish rapid and massive burning of the gaseous mixture prior to rapidly quenching the hot combustion products passing from the reaction zone so that the reaction time from the point of ignition to the point of quenching is of the order of one to four milliseconds.

As employed herein, the term "Mach number" refers to the ratio of the linear gas velocity of the mixture to the velocity of sound in the same mixture for the given temperature, pressure and gas composition.

As described in that application, the gaseous mixture of methane and oxidant entering the enlarged reaction zone from the mixer is ignited by the turbulence set up by the enlarged reaction zone and by high temperature refractory walls of the reaction chamber; and the position of the flame is held within the reaction chamber by this ignition of the gaseous mixture. While such an ignition procedure is successful in accomplishing the initiation of combustion and holding the flame in burners handling relatively small throughputs of gaseous mixtures, it is not practical for high volume commercial scale operations. If such refractory lined reaction chambers were employed for high-volume commercial scale operations, contact between the inner core of the stream of gaseous mixture and the hot refractory walls required for ignition would not be attained and the result would be the inefficient ignition of only the outer portion of the stream of gaseous mixture passing through such reaction chamber.

Accordingly, it is the main object of the present invention to provide a method and apparatus for treating large volumes of reactants to produce high volume-percent yields of acetylene by the partial oxidation of hydrocarbons in a high-temperature reaction zone. Other aims and advantages will be apparent from the following description and appended claims.

In the drawings:

Fig. 3 is a vertical cross-sectional view of a mixer employed in the system of Figs. 1 and 2.

Figure 1:
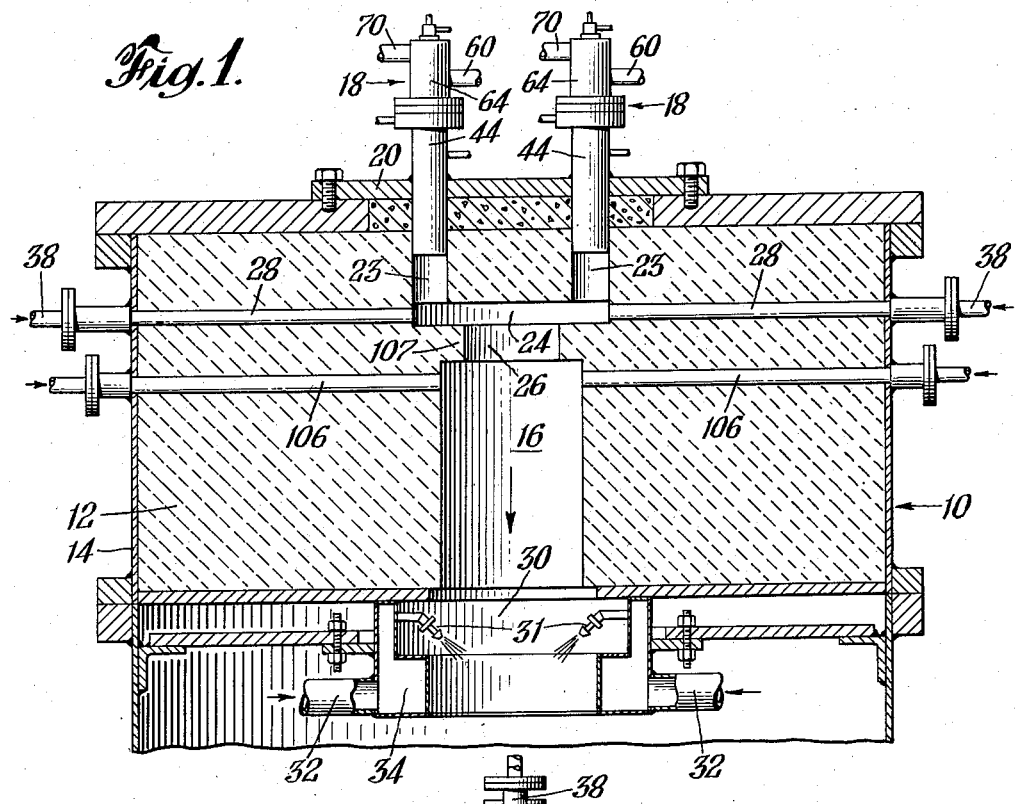
Fig. 1 is a partial vertical sectional view of a hot gas mixer and reactor system embodying the invention.

In accordance with the present invention, process and apparatus are provided for practicing on a high-volume commercial scale the process described and claimed in the copending application referred to hereinabove. The high velocity stream of gaseous mixture formed in the mixer stage in the manner described hereinabove is combusted in a massive burning operation in the reaction chamber where the flame is ignited and held against flashback to the mixing zone and blowout from the reaction chamber. The maintaining of the required critical time interval between the initiation of combustion (partial oxidation reaction) and quenching in this is insured by holding the flame at the proper location and accomplishing massive burning of the entire cross-section of the high velocity stream of gaseous mixture.

Since the stream of gaseous mixture is travelling at high velocity, burning is initiated and the flame is held by the impingement on that stream of at least one hard pilot flame of high velocity which cannot be blown out or off by the gas stream. The exact number of such high velocity pilot flames required to accomplish such massive burning (combustion of the entire stream of gaseous mixture as a single combustion as compared with multiple combustion of divided streams as accomplished in the prior art processes) is, of course, determined by the throughput of gaseous mixture. To provide uniform and concurrent burning of the entire stream of gaseous mixture many such high velocity jet pilot burners will be required for large-volume operations.

Referring specifically to the drawings, a reactor assembly 10 is provided composed of refractory 12 and having a metallic outer retaining member 14. Reactor assembly 10 has an internal reaction chamber 16 into which the mixed reactants are discharged and burned. One or more mixers 18 (four are shown in the embodiment of the drawings) are vertically mounted in a retaining plate 20 on the top of the reactor assembly 10, and discharge the reactant mixture through vertical passages 22 which converge in shallow ignition chamber 24 and, in turn, discharge therefrom through reduced section 26 to reaction chamber 16. By a plurality of high-velocity flame holders 28 means are provided for holding the flame at a point near the top of reaction chamber 16. Hot products of combustion resulting from the partial oxidation reaction carried out in reaction chamber 16 are discharged from the reaction chamber through quenching zone 30 where they are quenched with sprays of quenching fluid such as water or a volatile hydrocarbon entering quenching zone through spray nozzles 31. The quenched gases are then discharged from the lower end of quenching chamber 30 and passed to suitable means (not shown) for separating the acetylene from other components of the gaseous combustion products.

Quenching chamber 30 is provided with inlet conduits 32 communicating with annular passage 34 surrounding the quenching and, in turn, with spray nozzles 31 in the wall of quenching chamber 30.

Streams of fuel and oxidant are introduced through inlet means 38 to burners 28 to provide the hard pilot flames with which combustion is initiated in the reaction zone and the flame thereby held at the desired point. Flame holders are necessary since, as described above, the mixture of gaseous reactants is travelling at such velocities that the rate of flame burnback in the gaseous reaction mixture stream is not sufficiently high to maintain the flame at the desired point near the top of reaction chamber 16 without the use of flame holders.

As shown in detail in Fig. 3 of the drawing, mixer 18 comprises outer body member 64 to which oxidant and hydrocarbon inlet means 70 and 60 respectively are secured. Internal cylindrical injector member 80 is positioned in body member 64 and accomplishes the injection of the oxidant into the hydrocarbon stream at or near sonic velocity.

The preheated oxygen stream entering oxygen inlet means 70 passes through the annular space 74 between concentric sleeves 72 and 82 of injector member 80 and is fed outwardly through a series of radially disposed oxygen mixing ports 76 in the lower face of injector member 80. Concurrently therewith, the preheated hydrocarbon stream entering hydrocarbon inlet means 60 passes through annular space 52 between injector member 80 and outer body member 64 and inwardly through a hydrocarbon mixing slit 48 between injector member 80 and lower flange member 56. Slit 48 leads the hydrocarbon gases past the end of the oxygen mixing ports 76 approximately transversely and at a velocity of 0.5 to 1.0 Mach number. At the point of impingement, mixing of the two gas streams begins at high velocity and continues until the mixture passes through the length of mixer chamber 22 and out the discharge end.

A pressure ratio of approximately 2:1 (inlet to outlet pressure) is maintained across oxygen metering ports 80 to insure that the oxygen streams are discharged from the metering ports at or near sonic velocity. Mixing of the oxygen and methane streams begins at the point of impingement of these streams and continues throughout the entire length of the mixing passage, and intimate mixing is attained by the time the mixture is discharged from the mixing chamber. To insure that the combined oxygen and methane streams pass through slit 48 into mixing chamber 22 at or near sonic velocity an inlet to outlet pressure ratio of about 2:1 is maintained across this passage. Mixing is accomplished in a total elapsed time of 0.5 to 1.0 millisecond.

Mixer 18 is also provided with means for circulating cooling fluid, such as water therethrough. One stream of cooling fluid enters through conduit 68, positioned concentrically within sleeve 84 of injector member 80, and passes out of the injector member 80 through the annular space between conduit 68 and outer concentric sleeve 84 to outlet conduit 66. A second stream of cooling fluid enters the lower mixer body 44 containing a mixing chamber 22 through inlet conduit 46 into annular space 40 between concentric member 42 and outer shell member 44 thence to annular space 84 between concentric members 42 and 86 and from thence through port 50 to outlet conduit 78.

The plurality of streams of intimate mixture of preheated methane and oxygen are discharged from mixers 18, in the manner shown in Fig. 1, into passages 23 of the reactor assembly and from thence are led into the reaction chamber through a shallow ignition chamber 24, wherein combustion is initiated by burners 28 acting as flame-holding ignition burners.

Passage 24 directs the plurality of streams of intimate mixtures of preheated methane and oxygen toward the center of reaction chamber 16 where a high degree of turbulence and mixing is developed which aids in the spread of combustion (partial oxidation) reaction. The partial oxidation reaction is further aided by means of flame holder burners 106 located immediately below a refractory choke ring 107. The partial oxidation and acetylene forming reactions are completed as the gases pass through chamber 16.

The quenching zone 30 is provided at a point critically positioned downstream of the combustion-reaction zone. The position of the quenching zone determines the time interval between initiation of the combustion reaction and the quenching of the products of combustion, and must be sufficiently closely positioned to the combustion zone to quench before decomposition of acetylene produced but not so closely positioned to the combustion zone as to quench the combustion before the oxygen in the reactant mixture is substantially consumed.

A hot gas mixer and reactor system, similar to that shown in the embodiment of the drawing, was employed to mix and react methane and oxygen, the former preheated to 850° C. and the latter preheated to 605° C., to produce a product gas containing 9.2 volume percent acetylene on a dry basis. In a similar operation, a mixture of 90 percent methane-10 percent hydrogen (preheated to 860° C.) was mixed with oxygen (preheated to 600° C.) and this mixture was then reacted to produce a product gas containing 9.0 volume percent acetylene on a dry basis.

Figure 2:
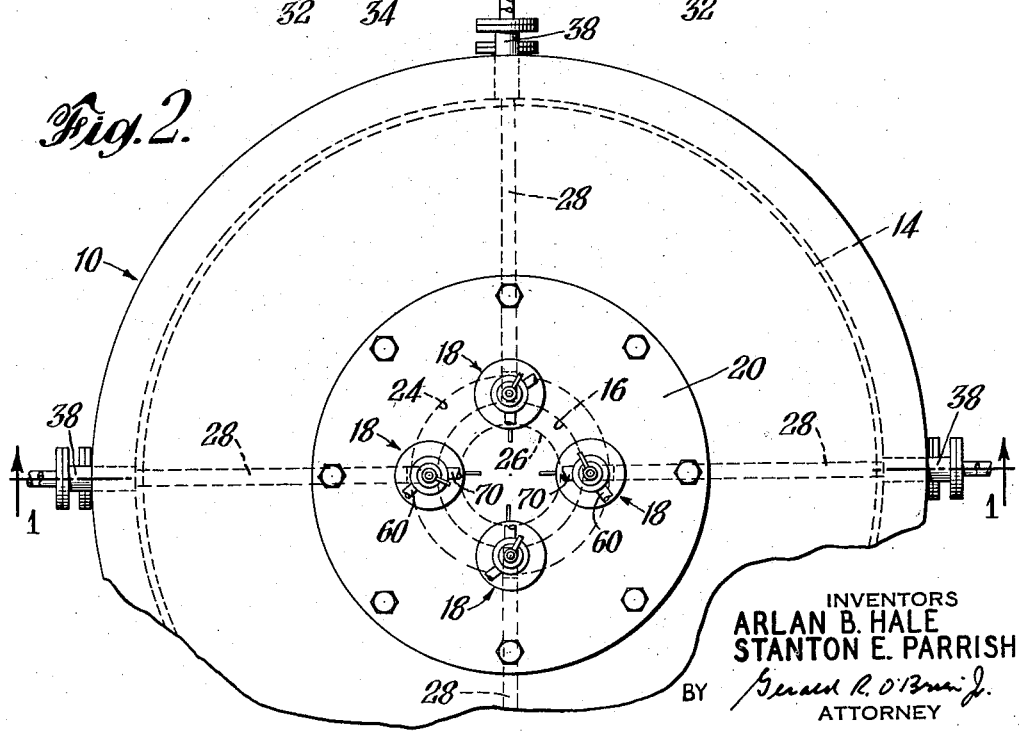
Fig. 2 is a partial top view of the system of Fig. 1.

In another example of the method of this invention, 80,000 cu. ft. per hour of methane preheated to 720° C. and 43,000 cu. ft of oxygen preheated to 600° C. were mixed at high velocity in water-cooled mixers of the type as shown in Fig. 3 of the drawing and assembled in a reactor assembly as shown in Figs. 1 and 2 of the drawing. The resultant mixed gas streams were discharged from the mixing chambers at about 0.6 Mach number and ignited near the entrance of the reaction chamber by flame holding ignition burners of the type shown in the drawings, each burning a mixture of approximately 100 cu. ft. per hour of methane and 200 cu. ft. per hour of oxygen. The gaseous reaction products were rapidly quenched with a water spray so that the reaction time between the ignition of the mixture and the entry to the quenching zone was of the order of 0.003 second. The product gas had the following analysis on a dry basis:

| Component: | Volume, percent |
|---|---|
| $C_2H_2$ | 8.7 |
| $CO_2$ | 2.8 |
| Olefins | 1.6 |
| $O_2$ | 0.2 |
| $H_2$ | 57.4 |
| CO | 22.5 |
| $CH_4$ | 5.9 |
| $N_2$ | 0.9 |
| Total | 100.0 |

What is claimed is:

1. A hot gas mixer and reactor system for the partial oxidation of hydrocarbons comprising, in combination, a reactor member having an internal combustion passage therein, said internal combustion passage having an inlet end and a discharge end; a relatively flat ignition chamber communicating with the inlet end of said internal combustion passage, said ignition chamber having a substantially shallower depth than width and being defined by walls including an inlet end wall and a discharge end wall, said discharge end wall having an opening communicating with said internal combustion passage; at least one mixer mounted in said reactor member and constructed and arranged to discharge a mixture of oxidant and hydrocarbon at a near sonic velocity into said ignition chamber through the inlet end wall and against the discharge end wall thereof; at least one flame-holding ignition burner means positioned in said reactor member to discharge laterally toward and adjacent to the communicating opening of the discharge end wall of said ignition chamber a firm high-velocity flame to ignite and maintain ignition of said oxidant and hydrocarbon mixture in the vicinity of the juncture of said ignition chamber and said internal combustion passage; quenching means positioned at the discharge end of said internal combustion passage for quenching the hot products of combustion produced in said passage; and means for collecting said quenched products of combustion and separating the components thereof.

2. The mixer and reactor system according to claim 1 wherein at least two mixers are provided, said mixers being positioned to discharge mixture streams of oxidant and hydrocarbon through the inlet wall of said ignition chamber and against the discharge wall thereof at opposite sides of said ignition chamber whereby the mixture streams from the mixers are caused to collide and to mix intimately and turbulently.

3. Apparatus for the partial oxidation of a fluid hydrocarbon comprising, in combination, reaction chamber means having inlet and discharge ends; relatively flat ignition chamber means communicating with the inlet end of said reaction chamber means, said ignition chamber means having a substantially shallower depth than width and being defined by walls including an inlet end wall and a discharge end wall, said discharge end wall having an opening communicating with said reaction chamber means; means for mixing preheated streams of said fluid hydrocarbon and oxidant and discharging at least one resultant mixed stream at a velocity greater than 0.5 Mach number into said ignition chamber through the inlet end wall and against the discharge end wall thereof; at least one flame-holding ignition burner means having a high velocity firm flame jet and positioned to ignite and maintain ignition of said resultant mixed stream in the vicinity of the juncture of said ignition chamber means and said reaction chamber means; quenching means positioned at the discharge end of said reaction chamber means for quenching the hot products of combustion produced therein; and means for collecting said quenched products of combustion and separating the components thereof.

4. The apparatus according to claim 3 wherein at least two resultant mixed streams of fluid hydrocarbon and oxidant are discharged into said ignition chamber through the inlet end wall and against the discharge end wall thereof at opposite sides of said ignition chamber whereby said resultant mixed streams are caused to collide and to mix initimately and turbulently.

5. The process for the partial oxidation of hydrocarbons which comprises providing preheated streams of fluid hydrocarbon and oxidant, mixing said preheated streams to form a mixture stream, flowing at least one such mixture stream at substantially sonic velocity and impinging such stream against a flat surface in an ignition zone, thereby effecting an abrupt angular change of direction and turbulent flow of such stream after impingement, flowing such stream from the ignition zone through an elongated reaction zone for reaction therein, providing at least one flame-holding ignition burner capable of providing a firm high-velocity flame, directing said flame holder flame into said mixture stream at a point adjacent said abrupt angular change of direction to ignite and maintain ignition of said mixture stream, quenching the hot products of reaction leaving said reaction zone, and collecting said quenched reaction products and separating the components thereof.

6. The process according to claim 5 wherein at least two mixture streams are impinged against flat surfaces at opposite sides of said ignition zone, thereby effecting abrupt angular changes of direction and turbulent and intimate mixing of such streams.

References Cited in the file of this patent

UNITED STATES PATENTS

| 2,572,338 | Hartwig et al. | Oct. 23, 1951 |
| 2,625,466 | Williams | Jan. 13, 1953 |
| 2,625,795 | Brzozowski | Jan. 20, 1953 |

UNITED STATES PATENT OFFICE

CERTIFICATE OF CORRECTION

Patent No. 2,868,856                                      January 13, 1959

Arlan B. Hale et al.

It is hereby certified that error appears in the above numbered patent requiring correction and that the said Letters Patent should read as corrected below.

In the grant, line 3, and in the heading to the printed specification, line 6, State of incorporation, for "Delaware" read -- New York --.

Signed and sealed this 30th day of June 1959.

(SEAL)
Attest:

KARL H. AXLINE                                            ROBERT C. WATSON
Attesting Officer                                      Commissioner of Patents